United States Patent [19]

Biswas et al.

[11] 4,443,239

[45] Apr. 17, 1984

[54] FABRICATION OF OPTICAL WAVEGUIDES USING SLURRY DEPOSITION

[75] Inventors: Dipak R. Biswas; Dilip K. Nath, both of Roanoke, Va.

[73] Assignee: International Telephone and Telegraph Corporation, New York, N.Y.

[21] Appl. No.: 379,835

[22] Filed: May 20, 1982

[51] Int. Cl.³ .............................................. C03B 19/06
[52] U.S. Cl. ........................................ 65/3.11; 65/13; 65/18.1; 264/1.5; 264/63
[58] Field of Search ....................... 65/3.11, 3.12, 3.2, 65/18.1, 144, 13; 427/163; 264/1.5, 2.6, 2.7, 63

[56] References Cited

U.S. PATENT DOCUMENTS

| | | | |
|---|---|---|---|
| 2,390,354 | 12/1945 | Clapp | 264/63 |
| 3,823,995 | 7/1974 | Carpenter | 65/3.12 X |
| 3,826,560 | 7/1974 | Schultz | 65/3.12 X |
| 3,993,495 | 11/1976 | Galliath et al. | 264/63 |
| 4,311,501 | 7/1982 | Fort et al. | 65/144 X |

FOREIGN PATENT DOCUMENTS 25230  3/1981  European Pat. Off. .............. 65/3.12

*Primary Examiner*—Richard V. Fisher
*Attorney, Agent, or Firm*—John T. O'Halloran; Peter R. Ruzek

[57] ABSTRACT

A tubular formation of particulate optical material is formed by a layer slurry deposition process which involves spraying layer after layer of slurry containing particles of the optical material onto a rotating rod-shaped bait. The composition of the slurry and particularly the index of refraction of the optical material may be varied from one layer to another or from one group of layers to another to obtain a graded or stepped refraction index profile in the formation, in an optical preform formed therefrom, and ultimately in the fiber drawn from the optical preform. The particles of the slurry are suspended in a liquid vehicle which evaporates in the spray stream or shortly after deposition, and are coated with an organic binder which holds them together in the layer and in the formation, so that the formation is self-supporting. Then, the organic binder is removed and the formation is sintered, followed by a collapse of the sintered tubular formation into the optical preform in the form of a solid rod. Then, optical fiber of the desired optical properties can be drawn from the optical preform. The associated apparatus includes a spray gun aimed at the bait rod, and a receptacle for the slurry from which the slurry is supplied to the spray gun. The bait rod is clamped in chucks and is rotated, while the spray gun moves in the axial direction of the bait rod in a plurality of passes to deposit the formation on the bait rod.

14 Claims, 3 Drawing Figures

FABRICATION OF OPTICAL WAVEGUIDES USING SLURRY DEPOSITION

BACKGROUND OF THE INVENTION

This invention relates to an improved process for forming optical preforms for the production of optical fibers. The process is especially suitable for making optical preforms which possess step or graded refractive index profiles. Such characteristics enable the production of optical fibers cables exhibiting reliable operating characteristics.

There has been a continuous search in the prior art for the economical and mass production of fiber optic cables for use in optical communications systems.

Thus, the prior art considered and describes techniques such as "soot" deposition or hydrolysis wherein a gas vapor mixture is hydrolyzed by a flame to form a glass precursor particulate. The particulate is then deposited on a rotating glass rod serving as a mandrel. The soot is deposited upon the mandrel in a perpendicular direction to provide successive layers of constant radius or to provide a composite article with radial gradations in the index of refraction by varying the dopant concentration during successive passes of the burner flame. The mandrel is then removed and the thus released cylindrical article is collapsed to a solid rod-shaped preform and then a fiber is drawn from this preform. This process is shown and discussed in U.S. Pat. No. 3,826,560 and U.S. Pat. No. 3,823,995. This process, however, is very laborious and time-consuming. Consequently, the preform and the fiber drawn therefrom are relatively expensive. Moreover, it is very difficult if not impossible to achieve a complete utilization of the soot or of the material from which it is obtained because of difficulties encountered in capturing and/or recycling such materials.

Other techniques, such as that described in U.S. Pat. No. 3,614,197 involve processes for continuously forming an optical fiber by using a multi-stepped funnel-shaped vessel to form a solid glass rod-shaped preform which is then heated and drawn into a fiber. Even this procedure is rather expensive and prone to result in contamination of the preform and the fiber by undesirable inclusions.

In any event, there is a desire to provide a solid optical preform and then draw or process the same into an optical fiber. Both the continuous forming process and the tubular preform forming and collapsing approach have inherent benefits in the mass production of such cables but also certain disadvantages.

Furthermore, U.S. Pat. No. 3,966,446 discusses another technique for providing an optical preform. The optical preform is here fabricated by the axial deposition from a direction along the preform axis as opposed to radial deposition from a direction perpendicular to the preform axis as used in the above-mentioned approaches. This technique does not require a mandrel and thus avoids the need for collapsing a cylindrical preform prior to drawing. Yet, even this technique is rather cumbersome and time-consuming and, consequently, expensive. In most instances, the avoidance of the need for collapsing the preform is more than outweighed by the inconvenience of using such a complicated process and the expense associated therewith.

The preforms thus provided in the just mentioned patent may be provided with longitudinal gradations in the index of refraction and thus serve to enhance certain types of mode conversions. However, this technique is not readily suited for providing radial gradations in the index of refraction. This is an additional reason for not using this approach in the fabrication of fiber with radially graded index of refraction.

In any event, there is a need to provide large optical preforms which then can be drawn into elongated optical fibers. There is a further need to provide an optical preform which can exhibit step, single mode or graded index profiles in the radial direction to enable the resultant cable to be used to more efficiently transmit optical information in the form of digital or other signals.

It is known that optical fiber cables which possess a single mode of operation alleviate mode dispersion problems. It has been a problem to produce reliable cables employing single mode operation in that the prior art techniques could not adequately control the composition of the cable. Moreover, it is difficult to assure that the operation will be conducted in the single mode under all operating conditions. Thus, many cables employ a multi-mode operation in using radial gradations in the index of refraction. In these cables the difference in velocity from mode to mode compensates for the different path lengths and results in a relatively equal traversal time for all modes.

It is clear that, in order to efficiently employ a single mode or a multi-mode operation, one must carefully and accurately control the fabrication of the fiber to assure that the same is consistent in formulation and hence, possesses repeatable and reliable operating characteristics.

The current fabrication techniques of all optical fiber preforms are broadly based on one fundamental principle, i.e. vapor phase deposition. For example, the reported processes are chemical vapor deposition (CVD), modified chemical vapor deposition (MCVD), outside vapor phase oxidation (OVPO), inside vapor phase oxidation (IVPO), and plasma-activated chemical vapor deposition (PCVD). In all these processes, metal halides, such as pure or doped silicon halides, are converted at high temperatures to the respective oxide particles and the chemical conversion and deposition processes occur simultaneously. As mentioned before, such conventional processes are rather time-consuming and expensive, especially because of the slow rate of growth of the deposited layer and the need for performing such processes in carefully controlled atmospheres and at relatively high temperatures.

SUMMARY OF THE INVENTION

Accordingly, it is a general object of the present invention to avoid the disadvantages of the prior art.

More particularly, it is an object of the present invention to develop a method of making an optical preform, especially one having a radially graded index of refraction, which does not possess the disadvantages of the conventional methods of this kind.

Still another object of the present invention is to provide a method of the kind here under consideration which is inexpensive to perform, results in a relatively rapid formation of the optical preform, and can be conducted at least predominantly under ambient conditions.

A concomitant object of the present invention is to devise an apparatus which is especially suited for performing the method of the present invention.

It is yet another object of the invention so to construct the apparatus as to be simple in construction, inexpensive to manufacture, easy to use, and reliable in operation nevertheless.

In pursuance of these objects and others which will become apparent hereafter, one feature of the present invention resides in a process for manufacturing an optical preform, this process comprising the steps of providing a bait; forming at least one slurry containing particles of an optical material with a predetermined index of refraction suspended in a liquid vehicle; depositing at least one cohesive layer of the particles on the bait, including covering at least a portion of the bait with the slurry and evaporating the liquid vehicle; removing the cohesive layer from the bait; and sintering the cohesive layer into the preform. Advantageously, the depositing step includes directing at least one stream of the slurry against the bait, and conducting relative movement between the stream and the bait.

When the bait is elongated and has a circumferential surface centered on an axis, it is advantageous when the conducting step includes performing relative movement between the bait and the stream of the slurry both in the axial and in the circumferential direction of the bait. A particularly simple solution is obtained when the performing step includes rotating the bait about its axis and moving the stream axially of the bait.

The process of the present invention further advantageously includes the step of repeating the depositing step to deposit an additional cohesive layer of the particles on top of the cohesive layer deposited during the previous depositing step. This expedient has particularly advantageous results when the forming step includes forming a plurality of slurries containing particles of optical materials with different indexes of refraction including the predetermined index of refraction. Then the repeating step includes using a slurry selected from the plurality of slurries which contains particles of a different index of refraction than those deposited during the previous depositing step.

According to a further advantageous facet of the invention, the forming step includes coating the particles with a binder which holds the particles together subsequent to the evaporation of the liquid vehicle. Then, the inventive process further includes the step of removing the binder from the cohesive layer at the latest immediately prior to the sintering step, especially by heating at least the cohesive layer to a temperature sufficient to expel the binder from the cohesive layer.

It is further advantageous when the process further comprises the step of heating at least the deposited layer in a hydrogen-free atmosphere prior to the sintering step to reduce the hydroxyl contents of the layer.

An apparatus for manufacturing an optical preform in accordance with the above method preferably comprises means for mounting a bait; at least one source of slurry containing particles of an optical material with a predetermined index of refraction suspended in a liquid vehicle; means for depositing at least one cohesive layer of the particles on the bait, including means for covering at least a portion of the bait with the slurry and for evaporating the liquid vehicle; and means for sintering the cohesive layer after its removal from the bait into the preform. Advantageously, the depositing means includes means for directing at least one stream of the slurry against the bait, and means for conducting relative movement between the directing means and the bait.

The apparatus may advantageously be used with an elongated bait having a circumferential surface centered on an axis. Then, the conducting means includes means for performing relative movement between the bait and the directing means both in the axial and in the circumferential direction of the bait. A particularly simple construction results when the mounting means mounts the bait for rotation about its axis and when the performing means includes means for rotating the bait, and means for moving the directing means axially of the bait.

Thus, a new and low cost process of fabrication of otpical waveguides is provided in which the chemical conversion to the oxides and the deposition are carried out in two distinctly separate steps. This process involves a layer slurry deposition (LSD) in which a slurry of silica or similar optical material is deposited in consecutive layers on a rotating bait surface at room temperature. The thus coated bait is then sintered to a preform from which optical fibers can subsequently be drawn.

To obtain the slurry or each of the slurries, chemically pure silica and/or doped silica powders are mixed with an organic vehicle (consisting of a solvent, binder and deflocculant). Viscosity of the slurry can be adjusted by controlling the ratio of powders to the liquid vehicle. By controlling the flow rate and adjusting the location of an atomizer which forms the directing means, the slurry or slurries will be sprayed directly onto a rotating bait surface. When the slurry droplets come out of the atomizer or spray gun, the solvent or liquid vehicle quickly evaporates in air and the solid silica particles coated with a thin film of organics uniformly deposit onto the bait surface. Layer after layer of different silica composition can be deposited to form a graded structure which will then be sintered followed by conventional fiber drawing.

A flow diagram of the optical fiber manufacture including the LSD process is shown below:

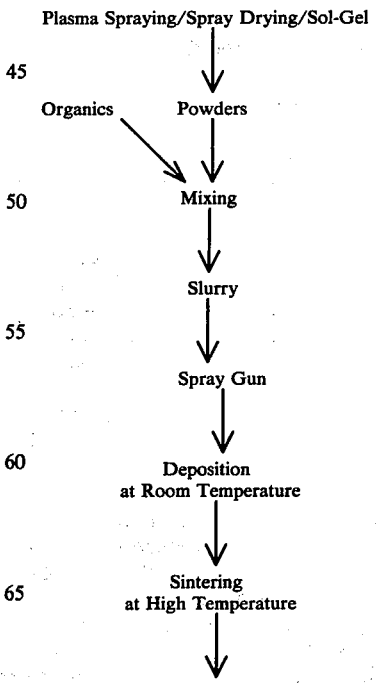

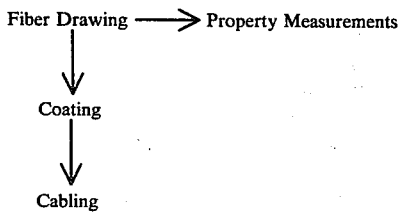

The sintering and fiber drawing steps can be performed as parts of a single process step.

BRIEF DESCRIPTION OF THE DRAWINGS

Above-mentioned and other features and objects of this invention will become more apparent by reference to the following description taken in conjunction with the accompanying drawing, in which.

DETAILED DESCRIPTION OF THE PREFERRED EMBODIMENTS

Figure 1:
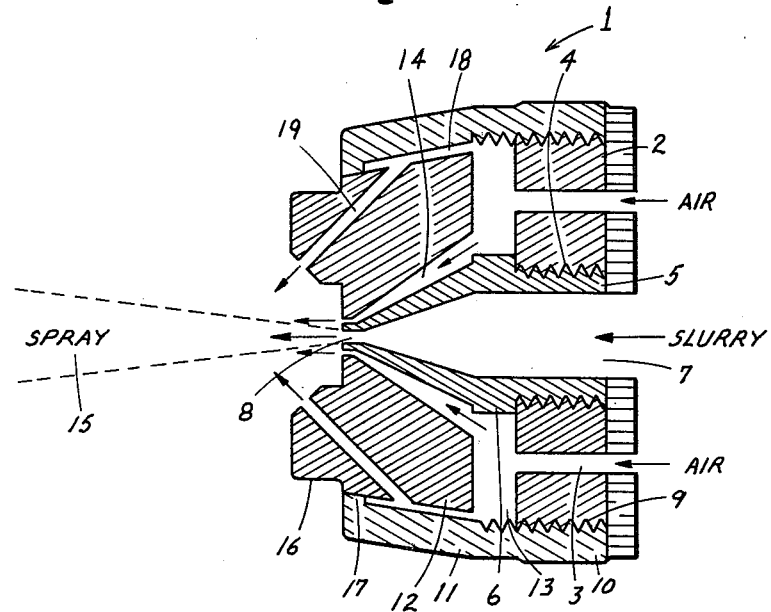
FIG. 1 is an axial sectional view of a spray gun head suitable for use in the practice of the invention.
Figure 2:
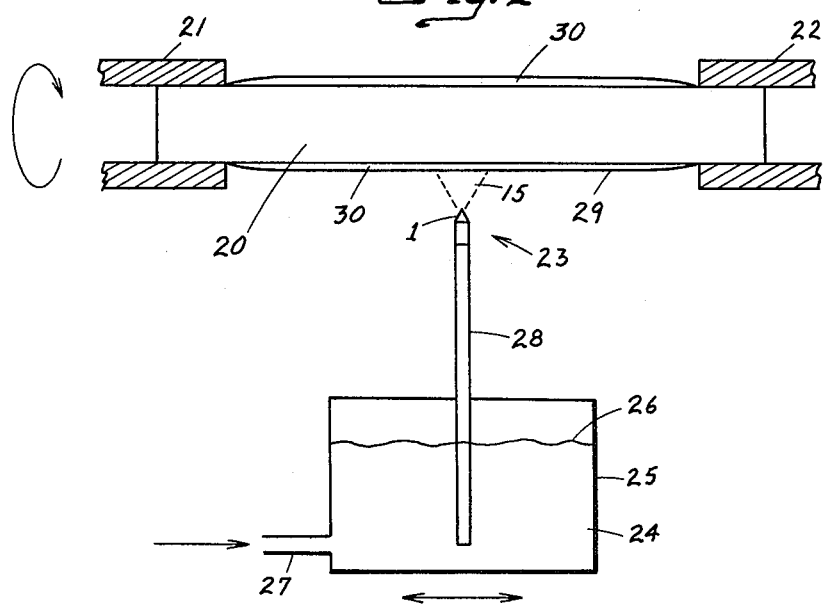
FIG. 2 is a diagrammatic side elevational view of an arrangement suitable for depositing the slurry on a bait or on a previously deposited layer.

Prior to or during the performance of the process of the present invention, powders of pure and/or doped silica or similar optical materials will be dispersed preferably in a non-aqueous liquid medium or vehicle, composed of a solvent, binder and deflocculant to make a slurry. The viscosity of this slurry can be controlled by adjusting the amount of its various constituents. When this slurry is sprayed on a surface, the solvent which is highly volatile will evaporate fast leaving a flexible but dimensionally stable or cohesive film. The particle size of the solid powders may vary between submicron to several hundred microns.

The constituents of the liquid vehicle, in general, should have the following properties:

Solvent
- Low boiling point and viscosity
- Soluble with binders and deflocculants
- Chemically inert to silica based powders Binder
- Should provide high strength to hold the silica particles together after the solvent evaporates
- Should readily evaporate or burn at temperatures below the sintering temperature to leave the cohesive layer prior to the sintering Deflocculant
- Should uniformly disperse silica powders in the slurry
- Should keep the powders in suspended state in the slurry.

Layers of films can be deposited one above the other consecutively with each layer having different dopant concentration to grade the refractive index profile. The composite article made in this way will be finally sintered to optically transparent glass in a gradient furnace and drawn into fiber.

The slurry for use in the present invention may be prepared as follows. Uniformly doped silica powders will be prepared in large quantities by plasma spray, sol-gel, spray drying or other similar technique. These techniques are so well known that they need not be discussed here. The plasma spray technique will be superior to the other techniques, in the sense that it does not require any OH removal operation. Furthermore, relatively cheaper raw materials can be used due to preferential volatilization of the impurities in plasma flame. However, the other techniques can also be used for producing the powders. In such a case, however, the cohesive layer or article is preferably heated in a hydrogen-free atmosphere to reduce the amount of hydroxyl groups therein.

The liquid vehicle will be prepared from an acetone based solvent, polyvinyl butyral, polymethyl methacrylate or other type of binders, and glycerol tri-oleate, benzene sulfonic acids or other type of deflocculants. Silica based powders will be suspended at room temperature in the liquid vehicle and agitated to produce a uniformly dispersed slurry. Depending on the desired Ge or other dopant concentration profile, the proper amount of silica/organic and doped silica/organic suspensions from two separate containers will be transferred to a mixing chamber.

The slurry will then be sprayed through a spray gun on a bait surface at room temperature. A typical spray gun head suited for directing a stream or spray of the slurry onto the bait is shown in axial section in FIG. 1, wherein the reference numeral 1 has been used to identify the spray gun head in its entirety. The spray gun head 1 includes an annular support member 2 which is provided with a plurality of flow passages 3 for an entraining medium, preferably a gaseous medium such as air. The support member 2 is provided in its center with an internally threaded bore 4 into which there is threaded an externally threaded portion 5 of a slurry nozzle 6. The nozzle 6 defines an internal flow passage 7 for the slurry which terminates in an outlet orifice 8. The support member 2 also has an externally threaded portion 9 onto which there is threaded an internally threaded portion 10 of a confining sleeve 11.

A guiding part 12 is confined in the interior of the confining sleeve 11 and bounds, together with the confining sleeve 11 and the nozzle 6, an air distributing compartment 13 or a plurality of such air distributing compartments 13. The guiding part 12 may be of one piece with the support member 2. A main flow passage 14 for the entraining medium, or a plurality of such main flow passages 14, is defined between the internal surface of the guiding part 12 and the external surface of the nozzle 6. This main flow passage communicates with the distributing compartment 13 and converges in the direction of flow of the entraining medium until it terminates at the outlet orifice 8. In operation, the entraining medium flows through the main flow passage 14 toward the region surrounding the outlet orifice 8 of the slurry nozzle 6, where it entrains droplets of the slurry for joint travel therewith in the form of a spray 15.

The spray gun head 1 further includes a cap 16 which has a conical outer surface and which is retained in position relative to the confining sleeve 11 by engagement with an inwardly projecting portion or bead 17 of the confining sleeve 11 with the conical outer surface of the cap 16. The cap 16 may be of one piece with the guiding part 12, in which case the engagement of the bead 17 with the cap 16 also retains the guiding part 12 in position relative to the confining sleeve 11. In this construction, the guiding part 12 need not be of one piece with the support member 2.

The outer surface of the guiding part 12 bounds an additional flow passage 18, or a plurality of such additional flow passages 18, with the internal surface of the confining sleeve 11. The flow passage 18 extends from the distributing compartment 13 to the bead 17 where it is sealingly closed by the latter. A flattening orifice 19, or a plurality of such flattening orifices 19, extends from the additional flow passage or passages 18 to a front region of the guiding part 12 as considered in the direction in which the spray gun head 1 is aimed. The orifice or plurality of orifices 19 is defined between the cap 16 and the guiding part 12. The flattening orifice or the plurality of such orifices 19 is so oriented that the entraining medium issuing therefrom will reduce the spread of or flatten the spray 15. A clean dry source of compressed air will preferably be used at a pressure between 60–100 lbs. to break up the slurry as it leaves the orifice 8 of the fluid nozzle 6, atomizing it and keeping the slurry within a cone-shaped area. When the slurry droplets come out of the spray gun , the solvent evaporates in air and the solid silica particles coated with thin film of organics deposit onto the bait surface. There the organics coating will serve as a binder to hold the particles in position relative to one another and thus to form a cohesive layer from such particles.

The bait surface and the spray gun arrangement can be made in several ways. One simple arrangement is shown in FIG. 2 where a thin bait rod 20 is mounted in a lathe chuck assembly 21, 22. Since the process is conducted at room temperature, the bait rod 20 may be selected from a wide variety of materials.

During the deposition process, a spray gun 23, which is shown to incorporate the spray gun head 1, will move at a controlled speed in a transverse manner as considered in the drawing, that is, axially of the bait rod 20. Layer after layer of the same or different silica composition may be deposited to form a uniform, stepped, or graded refractive index profile. The undeposited materials are collected and, to the extent feasible, recycled.

FIG. 2 also shows that a slurry 24 may be contained in a slurry receptacle 25, where the optical material particles are mixed in any conventional manner with the liquid vehicle and the deflocculant. In the illustrated construction, the slurry 24 forms an upper surface 26, and dry compressed air at appropriate pressure is admitted through an inlet conduit 27 into the receptacle 25, where it will bubble through the slurry 24 and rise to the upper surface 26 thereof. This passage of air through the slurry 24 may be sufficient to disturb the slurry 24 to such an extent that it may not be necessary to provide any additional mechanical stirring or mixing means to maintain the particles in suspension.

The spray gun 23 is connected to the receptacle 25 by a conduit 28 which, in the illustrated construction, is rigid. The conduit 28 extends through the upper level 26 of the slurry 24 to the bottom region of the receptacle 25. The pressure of the air present above the upper level 26 of the slurry 24 is at least sufficient to overcome the resistance encountered by the slurry 24 on its way to the spray gun head 1 due to the friction within it and between the slurry 24 and the internal surface of the conduit 28 and to the elevation difference between the upper level 26 and the spray gun head 1. Thus, the slurry 24 will rise at least to the orifice 8, (see FIG. 1) if not squirt beyond it, where it will be entrained for joint travel by the entraining gaseous medium to form the spray 15. This spray 15 eventually reaches the exposed surface of the bait 20 and forms a layer 29 thereon. The solvent or liquid vehicle is so volatile that it will evaporate, in most instances, while the particles of the optical material are still in transit in the spray 15. What remains is a thin film of the binder on the particles, which attaches such particles to one another in the just formed layer 29. This makes the layer 29 cohesive, so that the particles will stay in the layer 29.

In the construction illustrated in FIG. 2, the conduit 28 is rigid and is immovably connected to the receptacle 25. The receptacle 25, however, is mounted for movement axially of the bait rod 20, as indicated by the double-headed arrow. As the receptacle 25 is moved, by conventional moving means which has been omitted from the drawing, in the axial direction of the bait rod 20, the conduit 28 and the spray gun 23 with its spray gun head 1 mounted thereon also move in the axial direction of the bait rod 20 so that the spray 15 deposits the slurry 24 or the coated particles of the slurry first at one end of the exposed circumferential surface of the bait rod 20 and then progressively at adjacent regions of the exposed circumferential surface until the other end of the exposed circumferential surface is reached. Of course, the spray 15 is aimed on such an exposed surface, preferably along a plane including the longitudinal axis of the bait rod 20. However, it is also possible and contemplated for the receptacle 25 to be stationary, for the conduit 28 to be flexible, and for only the spray gun 23 with its head 1 to be movable in the axial direction of the bait rod 20.

A single layer 29 is deposited during each pass of the head 1 or of the spray 15 along the bait rod 20. To obtain uniformity in the deposited layer 29, it is advantageous if not mandatory to cover the exposed surface of the bait rod 20 around its entire circumference during the pass. In the illustrated construction, this is achieved by rotating the bait rod 20 about its longitudinal axis by rotating the chucks 21 and 22 which grip the bait rod 20 outside of the exposed surface, that is, outside of the area reached by the spray 15. Depending on the character of the movement of the spray head 1, the layer 29 will be deposited in successive overlapping annuli or in a continuous helical overlapping strip.

A single layer 29 is usually not sufficiently thick either to be self-supporting or to contain a sufficient amount of the particulate optical material to make an optical preform therefrom. Moreover, for obvious reasons, the layer 29 will have to have the same index of refraction throughout. For these reasons, the depositing operation is repeated in a plurality of passes, each of them resulting in the deposition of one coherent layer 29, until a formation 30 is provided on the bait rod 20. The formation 30 is self-supporting, due to the adhesion of the particles of the layers 29 to one another due to the action of the binder coating, both within each layer 29 and as between the layers 29. The formation 30 also includes the requisite amount of material to form an optical preform of the required size therefrom.

It will be appreciated that each of the passes of the spray 15 is an operation independent of the preceding and succeeding passes. Hence, in accordance with the present invention, it is contemplated to vary the composition of the slurry 24, if not from pass to pass, then from a group of passes to the next succeeding group of passes. In this respect, the main if not only variation is in the composition of the particulate material of the slurry 24 such that the index of refraction of the layers 29 of the formation 30 varies from one layer 29 to another or from one group of layers 29 to another. In the first instance, a radially graded refractive index profile is obtained in the formation 30, while the formation 30 has a radially stepped refractive index profile in the second instance. Each of these approaches has repercussions on the refractive index profile of the fiber drawn from the final preform such as to make the drawn fiber suitable for the intended use thereof.

As mentioned before, the formation 30 is self-supporting. Thus, at the end of the depositing operation, the bait rod 20 can be removed from the interior of the formation 30. Then, the formation 30 will be further handled to convert the same into a rod-shaped optical preform from which an optical fiber can be drawn. This further handling includes heating the formation 30 to a temperature of about between 500° and 600° C., at which the formation 30 still retains its basic particulate and porous character but the binder will either evaporate or become coverted in gaseous chemical compounds, such as by burning, so that it will escape from the formation 30 without a trace through the pores present between the particles. Yet, the formation 30 will remain self-supporting and retain its tubular shape, apparently due to point fusion of the particles and/or frictional and other mechanical forces between the particles. Thereafter, the formation 30 may be passed, if needed, through a zone containing hydrogen-free atmosphere to reduce the number of hydroxyl groups in the material of the formation 30. The next following step is the sintering of the tubular formation 30, which is conducted at a temperature of about between 1200° and 1400° C. In this sintering operation, the particles of the formation 30 will fuse with one another, thus eliminating most if not all of the pores of the formation 30. Yet, the formation still retains its tubular shape. Then, finally, the formation 30 is heated to a temperature of about 2000° C., resulting in an inward collapse of the formation 30 and in elimination of the remainder of the pores, if any, so that a solid rod-shaped optical preform is obtained.

The optical preform can then either be permitted to cool and be stored for future use or immediately used for drawing the optical fiber therefrom. The latter approach has the advantages not only of eliminating the need for additional handling steps between the formation of the optical preform and the drawing of the fiber therefrom, but also of utilizing at least a part of the heat content imparted to the preform during the previous pre-heating,, sintering and collapsing steps in the drawing operation. This results in a very economical operation which reflects itself in the manufacturing cost of the fiber.

Figure 3:
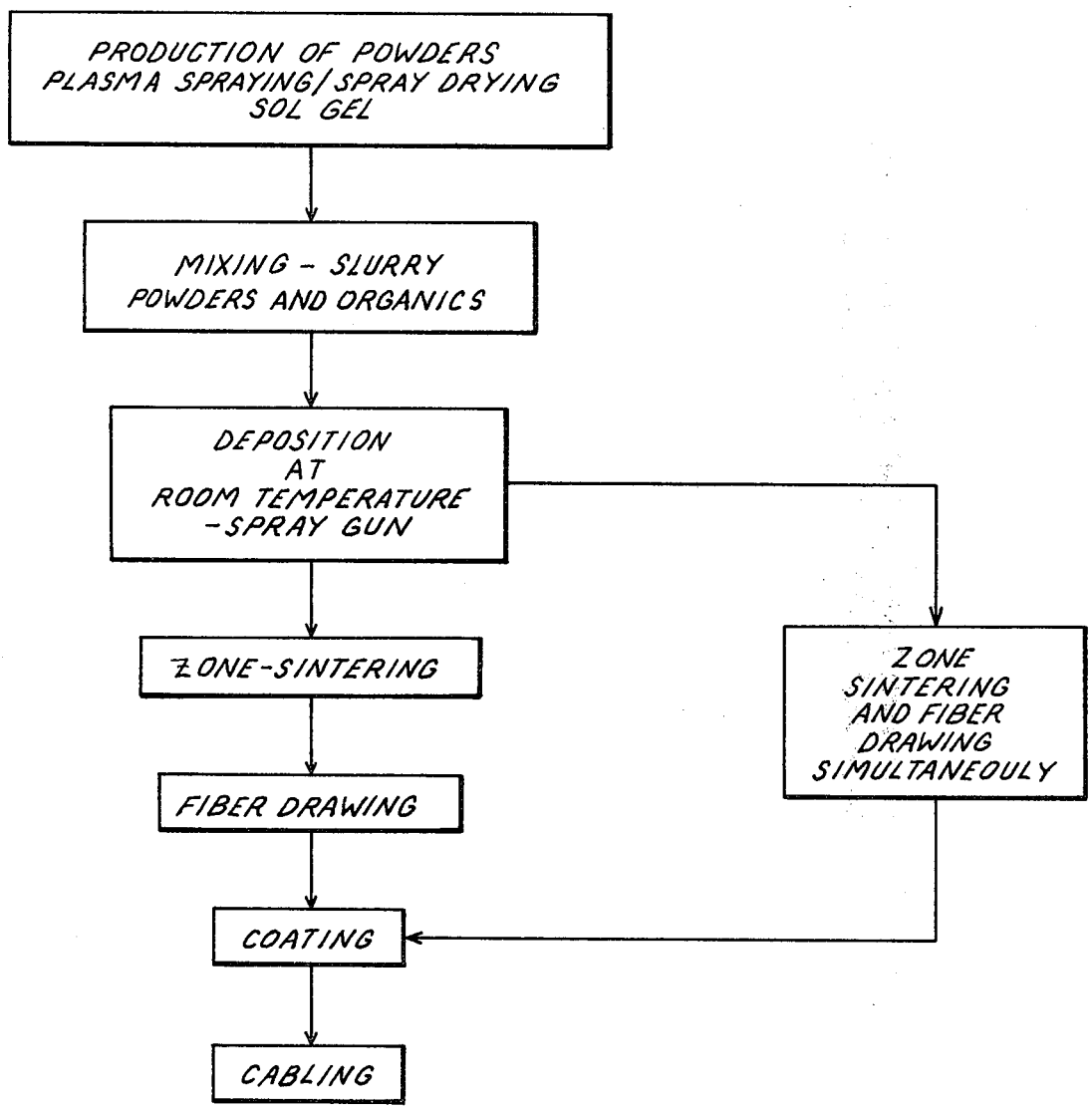
FIG. 3 is a flow diagram of the steps of a preferred manner of practising the invention.

The succession of steps involved in the production of an optical cable from the starting materials is diagrammatically illustrated in FIG. 3.

Another method of slurry deposition will be to traverse the rotating bait rod 20, keeping the spray gun position fixed. Other methods can be instituted to make optical fiber preform by the novel process described herein. The essential components of this process are to make a slurry out of silica based oxides and an organic vehicle system appropriate for the deposition of the particulate oxides in a dimensionally stable form at room temperature. The deposited materials will dry up instantaneously and sufficiently to assume the appearance of a solid layer which will have strong adherence to each other but not to the bait surface. The organic binder in this system will provide high strength to hold the solid particles together after the deposition and thus maintain precise dimensional control of the slurry preform. In essence, Layer Slurry Deposition (LSD) process has the following advantages.

Fibers of any required design can be processed due to precise control of refractive index profile.

Large preforms and hence long length fibers can be drawn.

High deposition rate and efficiency, low loss of raw materials and less expensive unit operations will make the fibers more cost-effective.

Because the system is non-aqueous and entirely organic, the chances of OH contamination during the deposition process is almost none.

The depositing operation can be conducted at room temperature.

While we have described above the principles of our invention in connection with specific apparatus, it is to be clearly understood that this description is made only by way of example and not as a limitation to the scope of our invention as set forth in the objects thereof and in the accompanying claims.

We claim:

1. A process for manufacturing an optical preform, comprising the steps of
   providing a bait;
   forming at least one slurry containing particles of an optical material with a predetermined index of refraction suspended in a liquid vehicle, including coating the particles with a binder;
   depositing at least one cohesive layer of the particles on the bait, including covering at least a portion of the bait with the slurry and evaporating the liquid vehicle while keeping the binder for the latter to hold the particles together in the cohesive layer subsequent to the evaporation of the liquid vehicle;
   dissociating the cohesive layer from the bait;
   removing the binder from the cohesive layer; and
   sintering the cohesive layer into the preform.

2. The process as defined in claim 1, wherein
   said depositing step includes directing at least one stream of the slurry against the bait.

3. The process as defined in claim 2, wherein
   said depositing step further includes conducting relative movement between the stream and the bait.

4. The process as defined in claim 3 for use with an elongated bait having a circumferential surface centered on an axis, wherein
   said conducting step includes performing relative movement between the bait and the stream of the slurry both in the axial and in the circumferential direction of the bait.

5. The process as defined in claim 4, wherein
   said performing step includes rotating the bait about said axis and moving the stream axially of the bait.

6. The process as defined in claim 1, and further comprising the step of repeating
   said depositing step to deposit an additional cohesive layer of the particles on top of the cohesive layer deposited during the previous depositing step.

7. The process as defined in claim 6, wherein
   said forming step includes forming a plurality of slurries containing particles of optical materials with different indexes of refraction including the predetermined index of refraction; and wherein
   said repeating step includes using a slurry selected from the plurality of slurries which contains particles of a different index of refraction from those deposited during the previous depositing step.

8. The process as defined in claim 1, wherein said removing step includes heating at least the cohesive layer to a temperature sufficient to expel the binder from the cohesive layer.

9. The process as defined in claim 1; and further comprising the step of heating at least the cohesive layer in a hydrogen-free atmosphere prior to said sintering step to reduce the hydroxyl contents of the cohesive layer.

10. An apparatus for manufacturing an optical preform, comprising
   means for mounting a bait;
   means for supplying at least one slurry containing particles of an optical material with a predetermined index of refraction suspended in a liquid vehicle and coated with a binder;
   means for depositing at least one cohesive layer of the particles on the bait, including means for covering at least a portion of the bait with the slurry from which the liquid vehicle is removed by evaporation while the binder remains therein to hold the particles together in the cohesive layer subsequent to the evaporation of the liquid vehicle;
   means for removing the binder from the cohesive layer after its dissociation from the bait; and
   means for sintering the cohesive layer subsequent to the removal of the binder into the preform.

11. The apparatus as defined in claim 10, wherein said depositing means further includes means for directing at least one stream of the slurry against the bait.

12. The apparatus as defined in claim 11, wherein said depositing means further includes means for conducting relative movement between said directing means and the bait.

13. The apparatus as defined in claim 12 for use with an elongated bait having a circumferential surface centered on an axis, wherein
   said conducting means includes means for performing relative movement between the bait and the directing means both in the axial and in the circumferential direction of the bait.

14. The apparatus as defined in claim 13, wherein
   said mounting means mounts the bait for rotation about said axis; and wherein
   said performing means includes means for rotating the bait, and means for moving said directing means axially of the bait.

* * * * *